Jan. 29, 1935.    G. W. CURTIS    1,989,271
TRANSMISSION GEARING
Filed Dec. 18, 1933    3 Sheets-Sheet 1

INVENTOR:
G. W. Curtis
HIS ATTORNEYS.

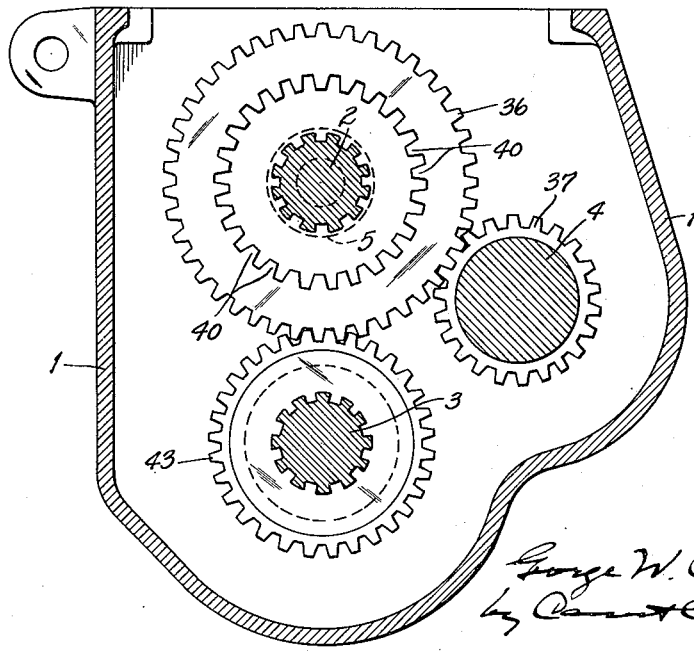

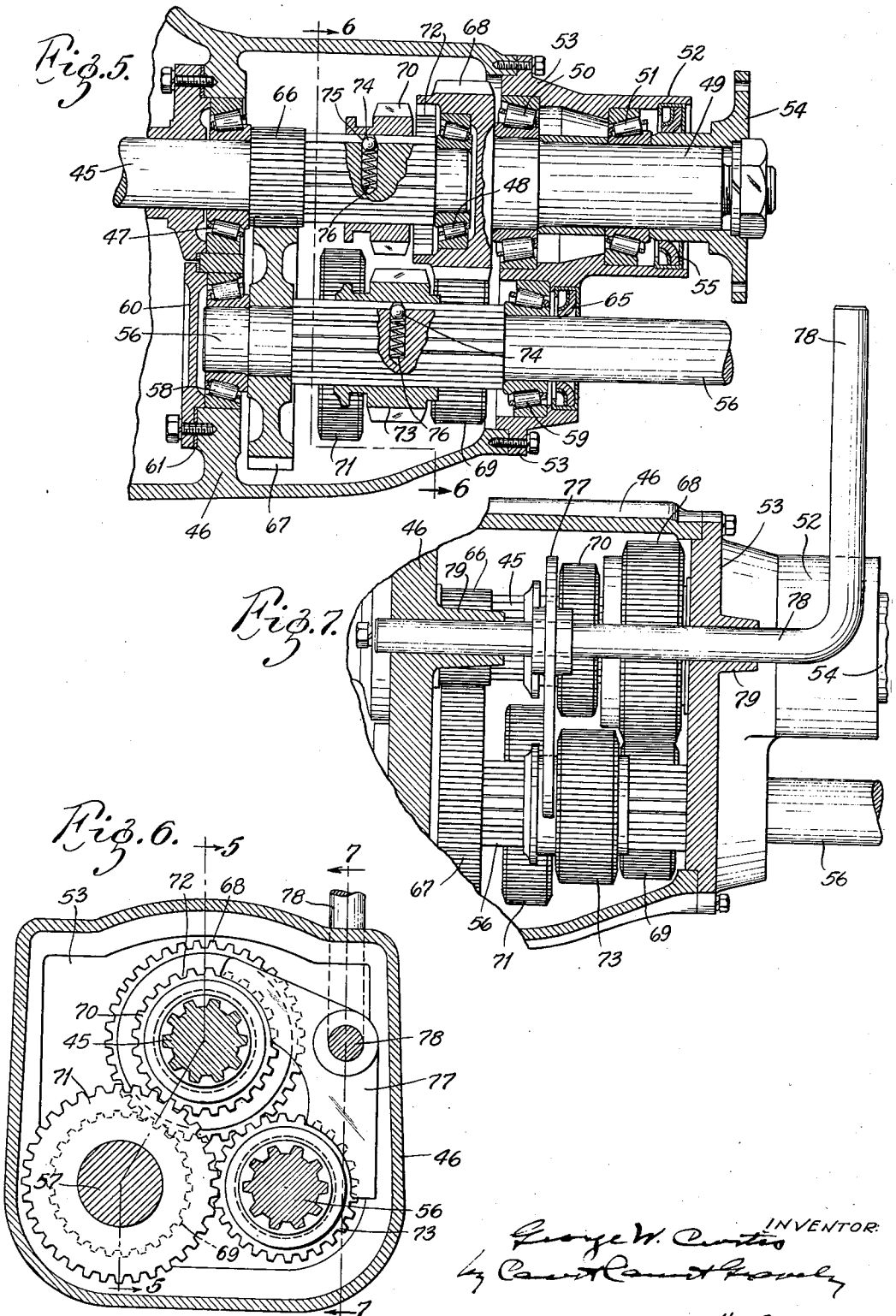

Patented Jan. 29, 1935

1,989,271

UNITED STATES PATENT OFFICE 1,989,271

TRANSMISSION GEARING

George W. Curtis, Milwaukee, Wis., assignor to The Timken Roller Bearing Company, Canton, Ohio, a corporation of Ohio Application December 18, 1933, Serial No. 702,867

10 Claims. (Cl. 74—343)

This invention relates to change speed transmission gearing. It has for its principal objects to provide a change speed transmission gearing of simple and efficient construction which can be quickly and easily operated and which will be of strong, durable and compact design. The invention consists in the change speed transmission gearing and in the construction, combinations and arrangements of parts hereinafter described and claimed.

Figure 1:
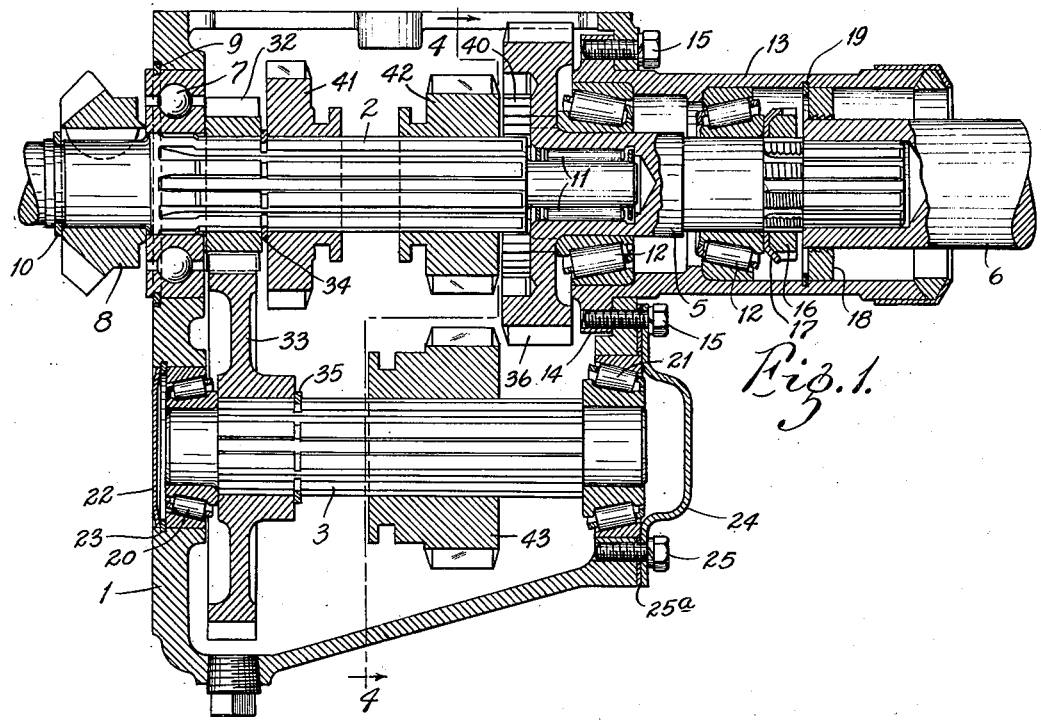
Figure 2:
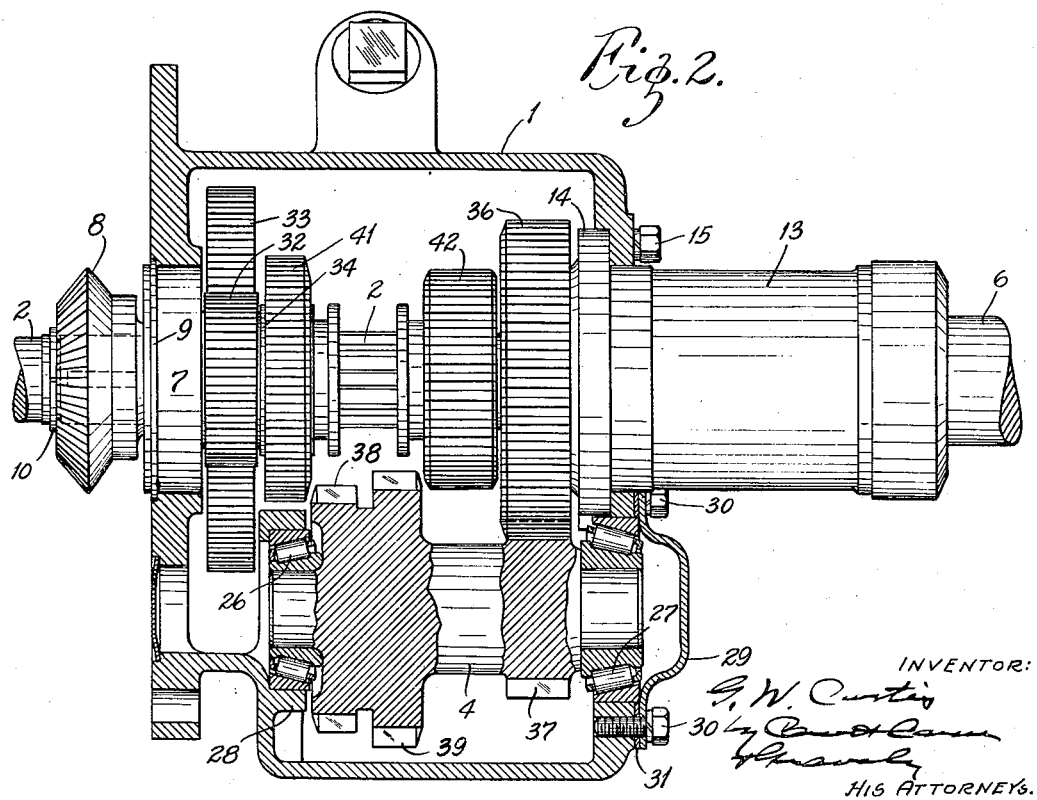

In the accompanying drawings, which form part of this specification and wherein like symbols refer to like parts wherever they occur, Fig. 1 is a central vertical longitudinal section through a change speed transmission mechanism embodying my invention, Fig. 2 is a section on the line 2—2 in Fig. 3, Fig. 3 is an end elevation of said mechanism, Fig. 4 is a vertical transverse section on the line 4—4 in Fig. 1, Fig. 5 is a longitudinal section through a modified form of change speed transmission mechanism, the section being taken on the line 5—5 in Fig. 6, Fig. 6 is a vertical transverse section on the line 6—6 in Fig. 5; and Fig. 7 is a vertical longitudinal section on the line 7—7 in Fig. 6.

Referring to Figs. 1 to 4 of the accompanying drawings, my change speed transmission mechanism comprises a main gear casing 1 within which are journaled a main drive shaft 2, a reverse countershaft 3 located below the drive shaft, a back gear shaft 4 located at one side of said drive shaft and countershaft, and a driven shaft 5 arranged in axial alinement with said drive shaft and having a spline connection with a shaft section 6.

The drive shaft 2 extends into the casing 1 through an opening in the front wall thereof and is rotatably supported in said opening by means of a suitable ball bearing 7 mounted in said opening. The drive shaft has a bevel gear 8 keyed thereon outside of said casing in abutting relation to the outer end of the ball bearing 7. Inward sliding movement of the roller bearing 7 in the opening therefor in the casing 1 is prevented by means of a snap ring 9, which seats in a recess at the outer end of said opening and in an annular groove in the outer raceway of said bearing. The bevel gear 8 is held in contact with the outer or forward end of the ball bearing 7 by means of a snap ring 10 seated in an annular groove formed in the drive shaft 2 at the forward end of said gear, thereby preventing forward movement of said bearing in said opening. The rear end of the drive shaft 2 is rotatably supported in a suitable roller bearing 11 mounted in an axial recess provided therefor in the adjacent forward end of the driven shaft 5.

The driven shaft 5 is journaled in two suitable taper roller bearings 12 mounted in a hollow cylindrical housing 13 that extends rearwardly from the transmission gear casing 1 through an opening in the rear wall thereof. The housing 13 is provided at its inner end with a circumferential flange 14 that is secured flatwise to the inner face of said wall by means of cap screws 15. The taper roller bearings 12 for the driven shaft 5 are adjusted by means of a nut 16, which is threaded on said shaft adjacent to the large end of the inner raceway of the rearmost bearing and is locked in the desired position of adjustment by means of a suitable lock washer 17 interposed between said nut and the inner raceway of said bearing. The annular space between the driven shaft section or extension 6 and the housing 13 is closed by means of a suitable closure ring 18, whose inward movement in the housing is limited by means of a snap ring 19 seated in an annular groove provided therefor in said housing.

The reverse shaft is supported at its ends in suitable taper roller bearings 20 and 21 mounted in openings provided therefor in the front and rear walls, respectively, of the gear casing 1. The opening for the bearing 20 in the front wall of the casing is closed by means of a suitable closure plate 22; and said bearing is prevented from outward movement in said opening by means of a snap ring 23, which is seated within an annular groove in said opening in abutting relation to the large or outer end of the outer raceway of said bearing. The supporting opening for the bearing 21 is closed by means of a cap 24 that is secured to the rear wall of the casing 1 by cap screws 25 and bears against the adjacent end of the outer raceway of the bearing 21. Adjustment of the two reverse shaft bearings 20 and 21 is accomplished by means of a plurality of thin shims 25a interposed between said cap 24 and the casing.

The back gear shaft 4 has its ends rotatably supported in suitable taper roller bearings 26 and 27, respectively. The bearing 26 for supporting the forward end of the back gear shaft is mounted in an opening provided therefor in a bracket 28 that projects laterally from the adjacent side wall of the casing; and the bearing 27 for supporting the rear end of said shaft is mounted in an opening provided therefor in the rear wall of said casing. The opening for the bearing 27 is closed by means of a cap 29 that is removably secured to the rear wall of the casing by suitable cap screws 30 and is disposed in abutting relation to the large end of the outer raceway of the bearing 27. The two bearings 26 and 27 are adjusted to take up wear by means of a plurality of thin shims 31 interposed between the cap 29 and the end wall of the casing.

The gearing for obtaining the various speed changes comprises a gear 32, which is splined on the drive shaft 2 and intermeshes continuously with a gear 33 splined on the reverse shaft 3. The gear 32 is held against movement longitudinally of the drive shaft 2 by the ball bearing 7 and a snap ring 34 seated in a groove formed in said shaft; and the gear 33 is held against endwise movement of the reverse shaft 3 thereon by the roller bearing 20 and a snap ring 35 seated in a groove in said reverse shaft. The driven shaft 5 is provided at its inner end with a gear 36 which is in continuous mesh with a back gear 37 formed on the back gear shaft 4. The driven shaft gear 36 is provided on its inner face with a series of clutch teeth 40, the purpose of which will hereinafter appear. The back gear shaft 4 is also provided with two gears 38 and 39, respectively. Slidably mounted on the splined portion of the drive shaft 2 are two gears 41 and 42, respectively. The gear 41 is adapted to be intermeshed with the gear 38 on the back gear shaft 4; and the gear 42 is adapted to be intermeshed with the gear 39 on said back gear shaft and clutched with the internal clutch teeth 40 of the driven shaft 5. Slidably mounted on the splined portion of the reverse shaft 3 is a gear 43 adapted to be intermeshed with the gear 36 on the driven shaft and also gear 39 on the back gear shaft. The slide gears 41, 42, of the drive shaft 2 and the slide gear 43 of the reverse shaft 3 are adapted to be selectively operated by the usual shifting forks (not shown).

The operation of the hereinbefore described change speed transmission mechanism is as follows: For driving in first or low speed the sliding gear 43 on the reverse shaft 3 is intermeshed with the gear 36 on the driven shaft 5, whereby the drive is transmitted from the drive shaft through the continuously intermeshing gears 32 and 33 to the reverse shaft and thence through the gears 43 and 36 to the driven shaft. For driving in second speed, the sliding gear 42 on the drive shaft 2 is intermeshed with the gear 39 on the back gear shaft 4, whereby the drive is transmitted from the slide gear 42 on the main shaft to the gear 39 on the back gear shaft and thence through the continuously intermeshing gears 37 and 36 to the driven shaft 5. For driving in third speed, the sliding gear 41 on the drive shaft 2 is clutched with the gear 38 on the back gear shaft 4, whereby the drive is transmitted through said gears 41 and 38 to the back gear shaft and thence through the continuously intermeshing gears 37 and 36 to the driven shaft 5. Direct or high speed drive is obtained by clutching the sliding gear 42 on the drive shaft with the internal clutch teeth 40 of the gear 36 on the driven shaft 5, whereby the drive and driven shafts are caused to rotate together at the same speed. Reverse drive is obtained by intermeshing the sliding gear 43 on the reverse shaft 3 with the large gear 39 on the back gear shaft 4, whereby the drive shaft is transmitted through the continuously intermeshing gears 32 and 33 to the reverse shaft, through the gears 43 and 39 to the back gear shaft 4 and thence through the continuously intermeshing gears 37 and 36 to the driven shaft 5.

In the embodiment of the invention shown in Figs. 5 to 7, the main drive shaft 45 extends through an opening provided therefor in the forward end of the casing 46 and is journaled in a suitable taper roller bearing 47 mounted in said opening. The rear end of said shaft is journaled in a suitable taper roller bearing 48 mounted in an axial recess in the forward end of the driven shaft 49. The driven shaft is journaled in taper roller bearings 50, 51 mounted in a cylindrical housing 52 provided therefor on a closure cap 53 for the rear end of the casing 46. The rear end of the driven shaft 49 is provided with a drive flange 54, and the space between the hub of said flange and the wall of the housing 52 is closed by a suitable oil seal 55. The reverse countershaft 56 and back gear shaft 57 are located below the axially alined drive and driven shafts 45 and 49 one on each side thereof.

The reverse shaft 56 has its ends journaled in taper roller bearings 58, 59, mounted respectively in openings provided therefor in the front wall of the casing and in the cap 53 for the rear end thereof. The opening for the forward bearing 58 is closed by means of a suitable cap 60; and adjustment of the two bearings is obtained by shims 61 interposed between the cap and the casing. The reverse shaft 56 extends rearwardly through the closure 53 for the rear end of the casing and constitutes a power take off; and the annular space between said shaft and the opening in said closure is closed by a suitable oil seal 65. The back gear shaft 57 is supported in the casing in substantially the same manner as the reverse shaft 56.

The drive shaft 45 is provided with a gear 66 that intermeshes continuously with a gear 67 on the reverse shaft 56; and the driven shaft 49 is provided with a gear 68 that intermeshes continuously with a gear 69 on the back gear shaft 57. The drive shaft 45 is provided with a sliding gear 70 adapted to be intermeshed with a gear 71 on the back gear shaft 57 or with a series of internal clutch teeth 72 in the gear 68 on the driven saft 49. The reverse shaft 56 is provided with a sliding gear 73 adapted to be intermeshed with the gear 68 on the driven shaft or with the gear 69 on the back gear shaft 57. With this arrangement, three forward speeds and one reverse speed are obtained. Low speed is obtained by intermeshing the sliding gear 73 on the reverse shaft 56 with the gear 68 on the driven shaft 49. Second or intermediate speed is obtained by shifting the sliding gear 70 on the drive shaft forward to engage the gear 71 on the back gear shaft. High speed is obtained by clutching the sliding gear 70 on the drive shaft with the gear 68 on the driven shaft. Reverse speed is obtained by clutching the sliding gear 73 on the reverse shaft with the gear 71 on the back gear shaft.

The sliding gears 70 and 73 are releasably held in neutral position on the drive shaft 45 and reverse shaft 56, respectively, by balls 74 that are mounted in transverse bores in said shafts and are yieldably held in notches 75 provided therefor in the splines in the hubs of said gears by means of coil springs 76. The slide gears 70 and 73 are selectively actuated by means of a single pawl or lever 77 fixed to a shift rod 78 mounted for rotary and axial sliding movement in axially alined bearings 79 provided therefor in the front and rear walls of the gear casing 46.

The sliding gears 70 and 73 are provided with annular grooves, each of which is adapted to be engaged by one arm of the pawl or rock lever 77. In the neutral position of the gearing the arms of the rock lever 77 are clear of the annular grooves of both sliding gears 70 and 73. When it is desired to shift either one of said sliding gears, the rod 78 is rotated to rock the lever 77 in a direction that will engage it with the desired gear, whereby said gear may be actuated independently of the other gear.

The hereinbefore described change speed transmission mechanism is of simple, economical and compact construction and can be quickly and easily operated. It is strong and durable and provides a maximum number of speeds with a minimum number of gears.

Obviously, numerous changes may be made without departing from the invention. Therefore, I do not wish to be limited to the precise arrangement shown and described.

What I claim is:

1. A change speed transmission mechanism comprising axially alined drive and driven shafts, a gear rigid with said drive shaft, said driven shaft having one gear only rigid therewith, a clutch element on said driven shaft, a countershaft, a gear rigid with said countershaft and intermeshing continuously with the drive shaft gear, a back gear shaft, a gear rigid with said back gear shaft and intermeshing continuously with the driven shaft gear, a single gear rotatable with and slidable on said countershaft and adapted to be intermeshed with said driven shaft gear, said rigid countershaft gear and said slidable countershaft gear being the only gears on said countershaft, a second gear rigid with said back gear shaft, and a gear rotatable with and slidable on said drive shaft and adapted to be intermeshed with the second gear on said back gear shaft and clutched with the clutch element of said driven shaft.

2. A change speed transmission mechanism comprising axially alined drive and driven shafts, a gear rigid with said drive shaft, a gear rigid with said driven shaft, a clutch element on said driven shaft, a countershaft, a gear rigid with said countershaft and intermeshing continuously with the drive shaft gear, a back gear shaft, a gear rigid with said back gear shaft and intermeshing continuously with the driven shaft gear, a gear rotatable with and slidable on said countershaft and adapted to be intermeshed with said driven shaft gear, a second gear rigid with said back gear shaft, a gear rotatable with and slidable on said drive shaft and adapted to be intermeshed with the second gear on said back gear shaft and clutched with the clutch element of said driven shaft, and a single means for selectively operating the slidable gears on said drive shaft and said countershaft.

3. A change speed transmission mechanism comprising axially alined drive and driven shafts, a gear rigid with said drive shaft, a gear rigid with said driven shaft, a clutch element on said driven shaft, a countershaft, a gear rigid with said countershaft and intermeshing continuously with the drive shaft gear, a back gear shaft, a gear rigid with said back gear shaft and intermeshing continuously with the driven shaft gear, a gear rotatable with and slidable on said countershaft and adapted to be intermeshed with said driven shaft gear, a second gear rigid with said back gear shaft, a gear rotatable with and slidable on said drive shaft and adapted to be intermeshed with the second gear on said back gear shaft and clutched with the clutch element of said driven shaft, and a single means for selectively operating the slidable gears on said drive shaft and said countershaft, said means comprising a pivotal and axially slidable lever adapted to optionally engage grooves provided therefor in said slidable gears.

4. A change speed transmission mechanism comprising axially alined drive and driven shafts, a gear rigid with said drive shaft, a gear rigid with said driven shaft, a clutch element on said driven shaft, a countershaft, a gear rigid with said countershaft and intermeshing continuously with the drive shaft gear, a back gear shaft, a gear rigid with said back gear shaft and intermeshing continuously with the driven shaft gear, a gear rotatable with and slidable on said countershaft and adapted to be intermeshed with said driven shaft gear, a plurality of gears rigid with said back gear shaft, and a plurality of gears rotatable with and slidable on said drive shaft and adapted to be intermeshed respectively with the plurality of gears on said back gear shaft, one of the slidable gears on said drive shaft being adapted to be clutched with the clutch element of said driven shaft.

5. A change speed transmission mechanism comprising axially alined drive and driven shafts, a gear rigid with said drive shaft, a gear rigid with said driven shaft, a clutch element on said driven shaft, a countershaft, a gear rigid with said countershaft and intermeshing continuously with the gear on said drive shaft, a back gear shaft, a gear rigid with said back gear shaft and intermeshing continuously with the gear on said driven shaft, a gear slidably splined on said countershaft and adapted to be intermeshed with the gear on said driven shaft, two gears slidably splined on said drive shaft, one of said two gears being adapted to be engaged with the clutch element on said driven shaft, and a second and third gear rigid with said back gear shaft and adapted to be engaged by the two slidable gears splined on said drive shaft.

6. A change speed transmission mechanism comprising axially alined drive and driven shafts, a gear rigid with said drive shaft, said driven shaft having one gear only rigid therewith, a clutch element on said driven shaft, a countershaft, a gear rigid with said countershaft and intermeshing continuously with said gear on said drive shaft, a back gear shaft, two gears rigid with said back gear shaft, one of said two gears intermeshing continuously with the gear on said driven shaft, a gear slidably splined on said drive shaft and adapted to be engaged with the clutch element of the driven shaft or intermeshed with the other of the two back gear shaft gears, and a gear slidably splined on said countershaft and adapted to be intermeshed with the last mentioned back gear shaft gear or with the gear on said driven shaft, said rigid countershaft gear and said slidable countershaft gear being the only gears on said countershaft.

7. A change speed transmission mechanism comprising axially alined drive and driven shafts, a gear rigid with said drive shaft, a gear rigid with said driven shaft, a clutch element on said driven shaft, a countershaft, a gear rigid with said countershaft and intermeshing continuously with said gear on said drive shaft, a back gear shaft, two gears rigid with said back gear shaft, one of said two gears intermeshing continuously with the gear on said driven shaft, a gear slidably splined on said drive shaft and adapted to be engaged with the clutch element of the driven shaft or intermeshed with the other of the gears on the back gear shaft, a gear slidably splined on said countershaft and adapted to be intermeshed with the last mentioned of said back gear shaft or with the gear on said driven shaft, and means on said drive shaft and said countershaft for yieldably holding the sliding gears thereon in inoperative position.

8. A change speed transmission mechanism comprising axially alined drive and driven shafts, a gear rigid with said drive shaft, a gear rigid with said driven shaft, a clutch element on said driven shaft, a countershaft, a gear rigid with said countershaft and intermeshing continuously with the gear on said drive shaft, a back gear shaft, two gears rigid with said back gear shaft, one of said two gears intermeshing continuously with the gear on said driven shaft, a gear slidably splined on said drive shaft and adapted to be engaged with the clutch element of the driven shaft or intermeshed with the other of the two gears on said back gear shaft, a gear slidably splined on said countershaft and adapted to be intermeshed with the gear on said driven shaft or with said other back gear shaft gear, means on said drive shaft and said countershaft for yieldably holding the sliding gears thereon in neutral position, and a lever mounted for sliding movement longitudinally of said drive shaft and said countershaft and for swinging movement transversely thereof, one arm of said lever being adapted to engage the sliding gear on said drive shaft and the other arm of said lever being adapted to engage the sliding gear on said countershaft.

9. A change speed transmission mechanism comprising a casing, axially alined drive and driven shafts extending into said casing from opposite ends thereof, a gear rigid with said drive shaft, a gear rigid with said driven shaft, an antifriction bearing in one end of said casing for rotatably supporting the adjacent end of said drive shaft therein, a housing member for said driven shaft removably secured to said casing, antifriction bearings interposed between said housing and said driven shaft, a countershaft journaled in said casing, a gear rigid with said countershaft and intermeshing continuously with the gear on said drive shaft, a gear slidably splined on said countershaft and adapted to be intermeshed with the gear on said driven shaft, said driven shaft gear being provided with clutch teeth, a back gear shaft journaled in said casing, a gear rigid with said back gear shaft and intermeshing continuously with the gear on said driven shaft, a second and third gear rigid with said back gear shaft, and two gears slidably splined on said drive shaft and adapted to be intermeshed with the second and third gear on said back gear shaft, one of said slidable gears being adapted to be clutched with the clutch teeth on the gear of said driven shaft.

10. A change speed transmission mechanism comprising a casing having axially alined openings in its opposite walls, a drive shaft extending into said casing through one of said openings, an antifriction bearing mounted in said opening for supporting said drive shaft therein, means for preventing inward movement of said antifriction bearing in said opening, a tubular housing member extending into the other of said openings and removably secured to the adjacent wall of said casing, a driven shaft in said tubular housing member, antifriction bearings interposed between said tubular housing member and said driven shaft, an antifriction bearing mounted in said driven shaft for rotatably supporting the adjacent end of the drive shaft therein, said driven shaft being provided with a gear and internal clutch teeth, a countershaft, bearings for supporting said countershaft in said casing, a gear splined on said drive shaft with one end in abutting relation to said first mentioned antifriction bearing, a snap ring seated in a groove provided therefor in said drive shaft in abutting relation to the other end of said gear, a gear splined on said countershaft with one end in abutting relation to the inner end of one of the supporting bearings therefor, a snap ring seated in a groove provided therefor in said countershaft in abutting relation to the other end of said gear, a gear slidably splined on said splined countershaft and adapted to be intermeshed with the gear on said driven shaft, a back gear shaft journaled in said casing, a gear on said back gear shaft intermeshing continuously with the gear on said driven shaft, a second and third gear on said back gear shaft, and two gears slidably splined on said drive shaft and adapted to be intermeshed respectively with said second and third gears on said back gear shaft, one of said last mentioned slidable gears being adapted to be clutched with the clutch teeth of said driven shaft.

GEORGE W. CURTIS.